(12) United States Patent
Song

(10) Patent No.: US 11,525,429 B1
(45) Date of Patent: Dec. 13, 2022

(54) SYSTEMS AND METHODS FOR HARNESSING HYDRO-KINETIC ENERGY

(71) Applicant: Saeheum Song, Skillman, NJ (US)

(72) Inventor: Saeheum Song, Skillman, NJ (US)

( * ) Notice: Subject to any disclaimer, the term of this patent is extended or adjusted under 35 U.S.C. 154(b) by 0 days.

(21) Appl. No.: 17/588,106

(22) Filed: Jan. 28, 2022

(51) Int. Cl.
*F03B 17/06* (2006.01)

(52) U.S. Cl.
CPC .................. *F03B 17/065* (2013.01)

(58) Field of Classification Search
CPC ...... F03B 17/06; F03B 17/062; F03B 17/065; F03B 17/067; F03D 3/067; F03D 3/068
See application file for complete search history.

(56) References Cited

U.S. PATENT DOCUMENTS

| | | | |
|---|---|---|---|
| 3,730,643 A | 5/1973 | Davison | |
| 4,110,630 A | 8/1978 | Hendel | |
| 4,246,753 A | 1/1981 | Redmond | |
| 4,263,516 A | 4/1981 | Papdakis | |
| 4,923,368 A | 5/1990 | Martin | |
| 5,758,911 A | 6/1998 | Gerhardt | |
| 6,672,522 B2 | 1/2004 | Lee et al. | |
| 6,877,968 B2 | 4/2005 | Godsall et al. | |
| 7,233,078 B2 | 6/2007 | Baarman et al. | |
| 7,253,536 B2 | 8/2007 | Fujimoto et al. | |
| 7,429,803 B2 | 9/2008 | Davis | |
| 7,452,160 B2 | 11/2008 | Cripps | |
| 7,709,971 B2 | 5/2010 | Sane et al. | |
| 7,834,475 B1 | 11/2010 | Costas | |
| 8,253,264 B2 | 8/2012 | Becker | |
| 8,624,417 B2 | 1/2014 | Song | |
| 8,759,996 B2 | 6/2014 | Song | |
| 8,933,574 B2 | 1/2015 | Song | |
| 2009/0072539 A1 | 3/2009 | Turner et al. | |
| 2011/0006531 A1 | 1/2011 | Ghouse | |
| 2011/0169266 A1 | 7/2011 | Song | |
| 2019/0145379 A1* | 5/2019 | Potter | F03D 3/062 416/1 |
| 2019/0242361 A1 | 8/2019 | Song | |

FOREIGN PATENT DOCUMENTS

| | | | | |
|---|---|---|---|---|
| KR | 200443971 Y1 * | 3/2009 | ............ | F03B 17/06 |
| WO | WO-2014194831 A1 * | 12/2014 | ............ | F03B 17/065 |
| WO | WO-2020187374 A1 * | 9/2020 | | |

* cited by examiner

*Primary Examiner* — Richard A Edgar

(74) *Attorney, Agent, or Firm* — Knobbe, Martens Olson & Bear, LLP

(57) ABSTRACT

Systems and methods for harnessing hydro-kinetic energy. The system includes a single central axle, a plurality of vanes, and a generator. The plurality of vanes may be configured to rotate about the central axle. Each vane may include a frame and a panel rotatably attached the frame. The panel may comprise a plurality of channels having a C-shaped cross-section. Movement of surrounding water may cause the panel to rotate relative to the frame between an open and closed position. The generator may be configured to convert the rotational motion of the plurality of vanes into electrical energy.

13 Claims, 10 Drawing Sheets

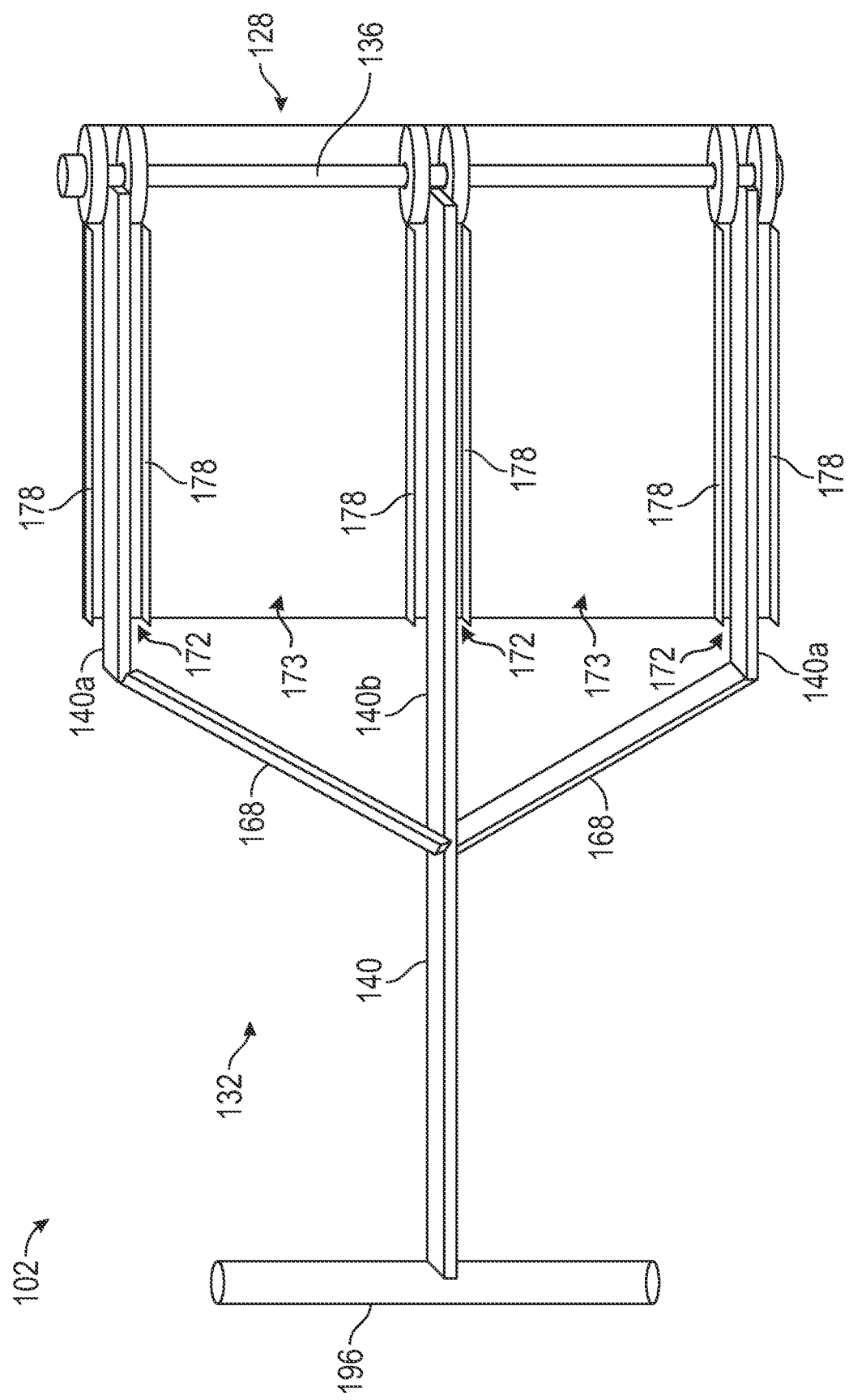

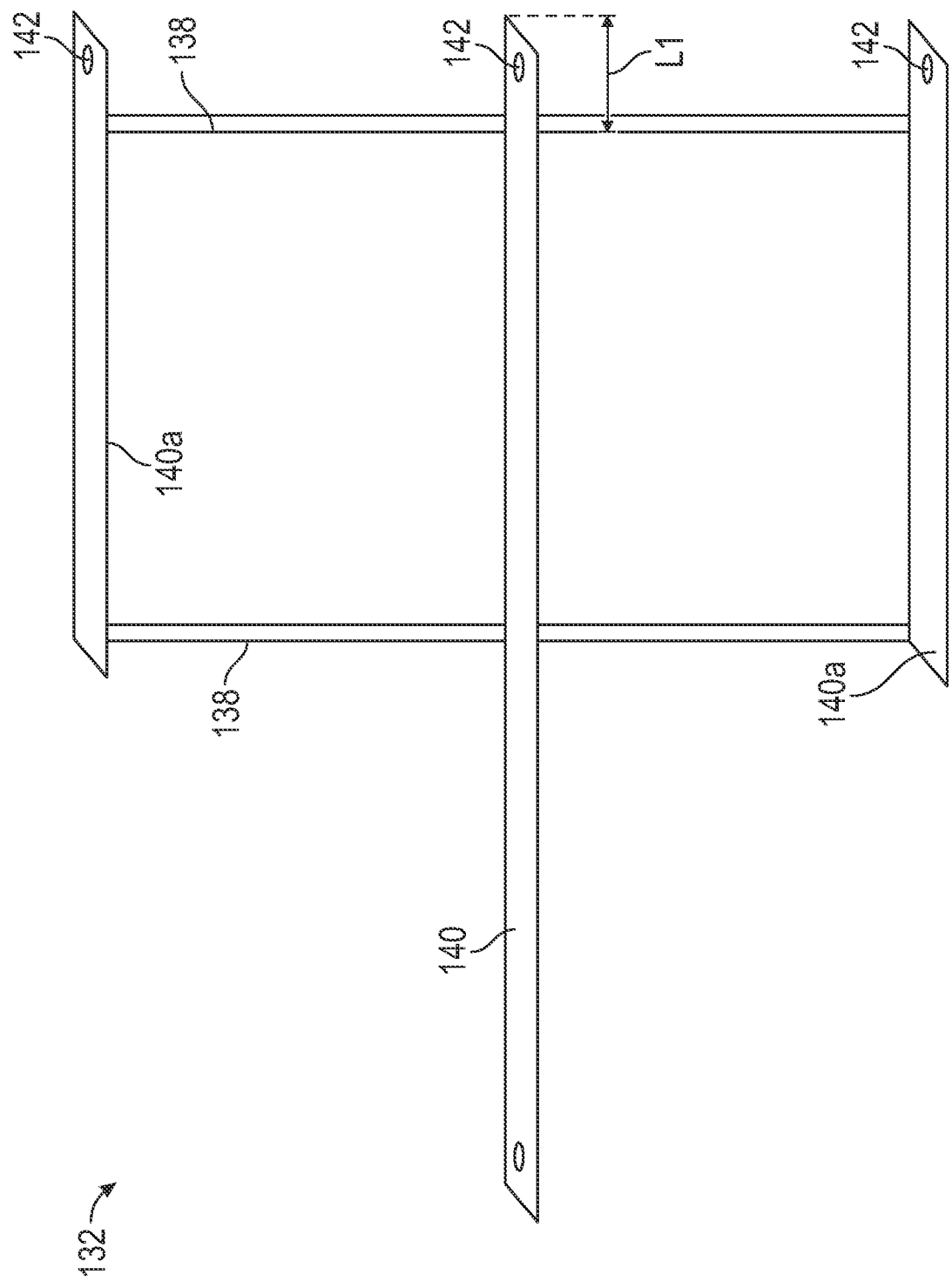

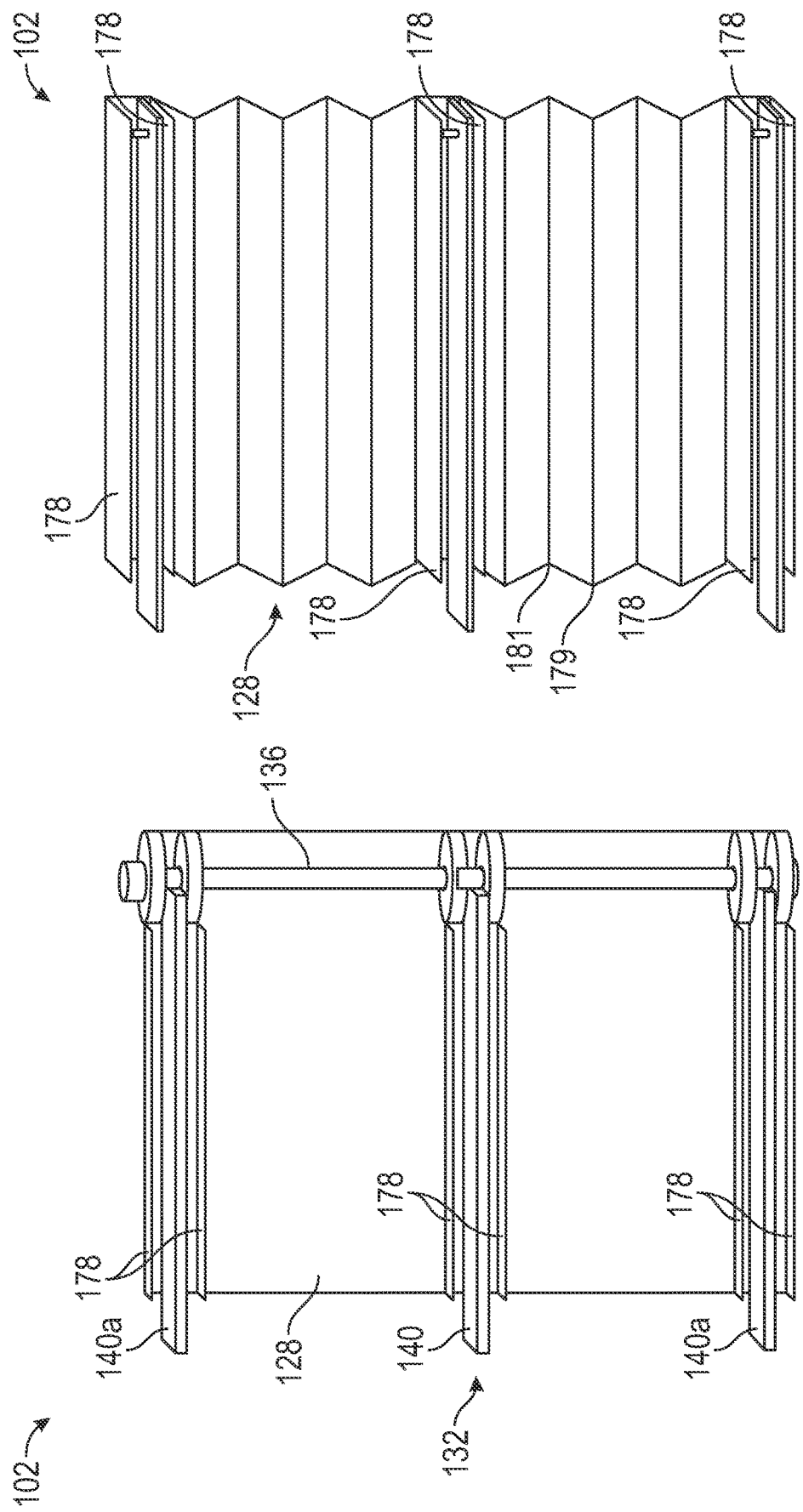

SYSTEMS AND METHODS FOR HARNESSING HYDRO-KINETIC ENERGY

BACKGROUND

Field

The development relates generally to systems and methods for harnessing hydro-kinetic energy, in particular to such systems and methods using rotating vanes with flow channels.

Description of the Related Art

The importance of utilizing natural, clean, renewable energy has emerged as critical in order to combat global warming. Kinetic energy sources from water movement have been used. The use of horizontal hydro-kinetic energy in a traditional water mill or propeller-type generator requires a minimum water flow of a few meters per second and is greatly restricted by geographical location. The use of vertical falling water to harness hydro-kinetic energy is largely limited by the use of an existing natural fall, like Niagara Falls, or by building a dam to hold water above a dam area to create height for harnessing hydro-kinetic energy. Wave energy can be a harsh circular oscillatory hydro-kinetic energy movement, which is a composite of both potential energy and hydro-kinetic energy. Current methods of harnessing wave energies are generally limited by capturing part of available energy, either one of up-and-down movement of wave peak and trough, or lateral breakthrough wave movement, but not as an oscillatory movement. In addition, when harnessing hydro-kinetic energy, especially wave energy, the system needs to withstand incoming thrust, which adds to the weight and bulkiness of a system resulting in low efficiency and a high cost of production. There exists a need for improved hydro-kinetic energy systems that overcome these and other drawbacks of existing solutions, especially in harnessing oscillatory hydro-kinetic energy movement of wave, which will increase the harnes sable wave energy quantity

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods for harnessing hydro-kinetic energy.

The following disclosure describes non-limiting examples of some embodiments. For instance, other embodiments of the disclosed systems and methods may or may not include the features described herein. Moreover, disclosed advantages and benefits may apply only to certain embodiments of the invention and should not be used to limit the disclosure.

Systems, devices, and methods are described for harnessing hydro-kinetic energy. The system may include a single central axle, a plurality of vanes, and a generator. The plurality of vanes may be configured to rotate about the central axle. Each vane may include a frame and a panel rotatably attached the frame. The panel may comprise a plurality of flow channels, which may have open cross-sections such as a C-shaped cross-section. Movement of surrounding water may cause the panel to rotate relative to the frame between an open and closed position. The generator may be configured to convert the rotational motion of the plurality of vanes into electrical energy.

In one aspect, a system for harnessing energy includes a single central axle, a plurality of vanes, and a generator. The single central axle defines a central axis. The plurality of vanes are configured to rotate about the central axis. Each vane comprises a rod extending from the central axle, a frame attached to the rod, and a panel rotatably attached to an outer end of the rod. The panel comprises a series of perpendicularly extending blades forming a plurality of channels each having a C-shaped cross-section and at least two of the channels having differing widths. Movement of surrounding water in a first direction causes the panel to rotate relative to the rod between an open position and a closed position as the rod rotates about the central axis. In the closed position the panel contacts the frame with members of the frame located within a respective channel of the plurality of channels such that a thrust force applied by the moving water to the panel is maximum. In the open position the panel is approximately at a right angle to the rod while rotating against the first direction of the moving water such that the moving water flows through the channels and the thrust force applied by the moving water to the panel is minimum. The generator is configured to convert the rotational motion of the plurality of vanes into electrical energy.

Various embodiments of the various aspects may be implemented. In some embodiments, the rod has an elongated cross-section such that the rod, when adjacent to the panel in the closed position, forms an additional channel having the C-shaped cross-section. In some embodiments, the panels comprise a corrugated contour. In some embodiments, the series of blades comprise a first blade having a longer length than the remaining blades. In some embodiments, the first blade having the longer length is positioned between the remaining blades. In some embodiments, the outer end of the rod comprises a panel axle that rotatably connects the rod and the panel. In some embodiments, the system further comprises a stop configured to prevent rotation of the panel in the open position beyond a maximum rotation angle. In some embodiments, the system comprises two or more of the vanes. In some embodiments, the system is configured to generate electrical energy with the central axis oriented perpendicular or parallel to a surface of the moving water.

In another aspect, a system for harnessing energy from moving water includes a central axle, a rod, a panel, and a generator. The central axle defines a central axis. The rod extends radially from the central axle and is configured to rotate about the central axis. The panel is attached to a radially outer end of the rod and has a plurality of blades extending away from the panel forming one or more open cross-section flow channels with the panel. The panel is configured to rotate relative to the rod between open and closed positions as the rod rotates about the central axis in response to force applied to panel in the closed position by moving water. The generator is configured to convert the rotational motion of the one or more vanes into electrical energy.

Various embodiments of the various aspects may be implemented. In some embodiments the open cross-section flow channels are C-shaped or U-shaped flow channels. In some embodiments, the system further comprises a frame fixedly attached to the radially outer end of the rod and rotationally coupling the panel to the rod. In some embodiments, the frame further comprises a first pole extending through radially outer ends of the plurality of blades. In some embodiments, the one or more open cross-section flow channels comprise a first open cross-section flow channel and a second open cross-section flow channel. The first and second open cross-section flow channels have different widths. In some embodiments, the rod is planar and extends within a plane of rotation about the central axis such that the rod is parallel to the plurality of blades in the closed position. In some embodiments, the panel in the closed position forms an angle with the rod that is less than thirty degrees and the panel in the open position forms an angle with the rod that is greater than seventy-five degrees.

In another aspect, a method of harnessing energy from moving fluid includes rotating a rod about a central axis with a flow direction of the moving fluid, the rod having a panel rotatably attached to a radially outer end of the rod and the panel having one or more blade extending outwardly therefrom to form one or more flow channels. The method further includes rotating the panel toward the rod, as the rod rotates about the central axis with the flow direction of the moving fluid, rotating the rod about the central axis against the flow direction of the moving fluid, rotating the panel away from the rod, as the rod rotates about the central axis against the direction of the moving fluid, such that the moving fluid flows through the one or more flow channels, and converting the rotational motion of the rod into electrical energy.

Various embodiments of the various aspects may be implemented. In some embodiments the one or more flow channels comprise open cross-section flow channels. In some embodiments, the method further comprises rotating the panel relative to the rod via a frame that rotatably connects the panel and rod. In some embodiments, the moving fluid comprises a moving water in a body of water and the method further comprises orienting the central axis perpendicular or parallel to a surface of the moving water.

In another aspect, a system for harnessing wave energy includes a vane assembly and a mounting assembly. The vane assembly includes a vane and a vane frame. The vane includes a vane panel having a first end and a second end, a first protrusion extending generally perpendicular from the first end and a second protrusion extending generally perpendicular from the second end. The vane frame includes at least one blade rotatably coupled at one end to the vane and coupled at a second end to a center mount. The mounting assembly includes a flotation member, a first and a second vertical member each having a first and second end, and a first and second leg for securing the mounting assembly to a surface. The first and second vertical members are connected at their respective first ends by the flotation member and connected at their respective second ends by a horizontal member. The first leg is coupled to the second end of the first vertical member and the second leg is coupled the second end of the second vertical member. The at least one vane assembly is coupled to the horizontal member via the center mount and configured to rotate around the horizontal member when a thrust is applied to the vane panel via water moment. The thrust applied to the vane panel will cause the vane panel transition between an open and a closed position while rotating around the horizontal member.

Various embodiments of the various aspects may be implemented. In some embodiments the vane frame comprises at least two blades. In some embodiments one of the at least two blades has a longer length than the remaining blade(s). In some embodiments, the blade is coupled to a connector extending from a side of the vane panel. In some embodiments, the blade is coupled to a rod and the rod is rotatably coupled to the vane panel. In some embodiments, the connector prevents a rotation exceeding 180 degrees.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawing, may be arranged, substituted, combined, and designed in a wide variety of different configurations, all of which are explicitly contemplated and make part of this disclosure.

FIG. 4A is a perspective view of an embodiment of a vane with a rotatable panel having open cross-section flow channels, and that may be used with the various energy harnessing systems of FIGS. 1-3.

FIG. 4B is a perspective view of an embodiment of a rod and frame that may be used with the various vanes described herein, such as those of FIGS. 1-4A.

FIG. 6B is a perspective view of an embodiment of a panel and a partial frame that may be used with the various vanes described herein, such as those of FIGS. 1-6A.

FIG. 6C is a perspective view of an embodiment of a panel having a corrugated topography that may be used with the various energy harnessing systems and devices described herein, such as those of FIGS. 1-6B.

DETAILED DESCRIPTION

The following detailed description is directed to certain specific embodiments of the hydro-kinetic energy harnessing systems, devices, and methods. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments. Reference will now be made in detail to embodiments of the invention, examples of which are illustrated in the accompanying drawings. Wherever possible, the same reference numbers will be used throughout the drawings to refer to the same or like parts.

Figure 1:
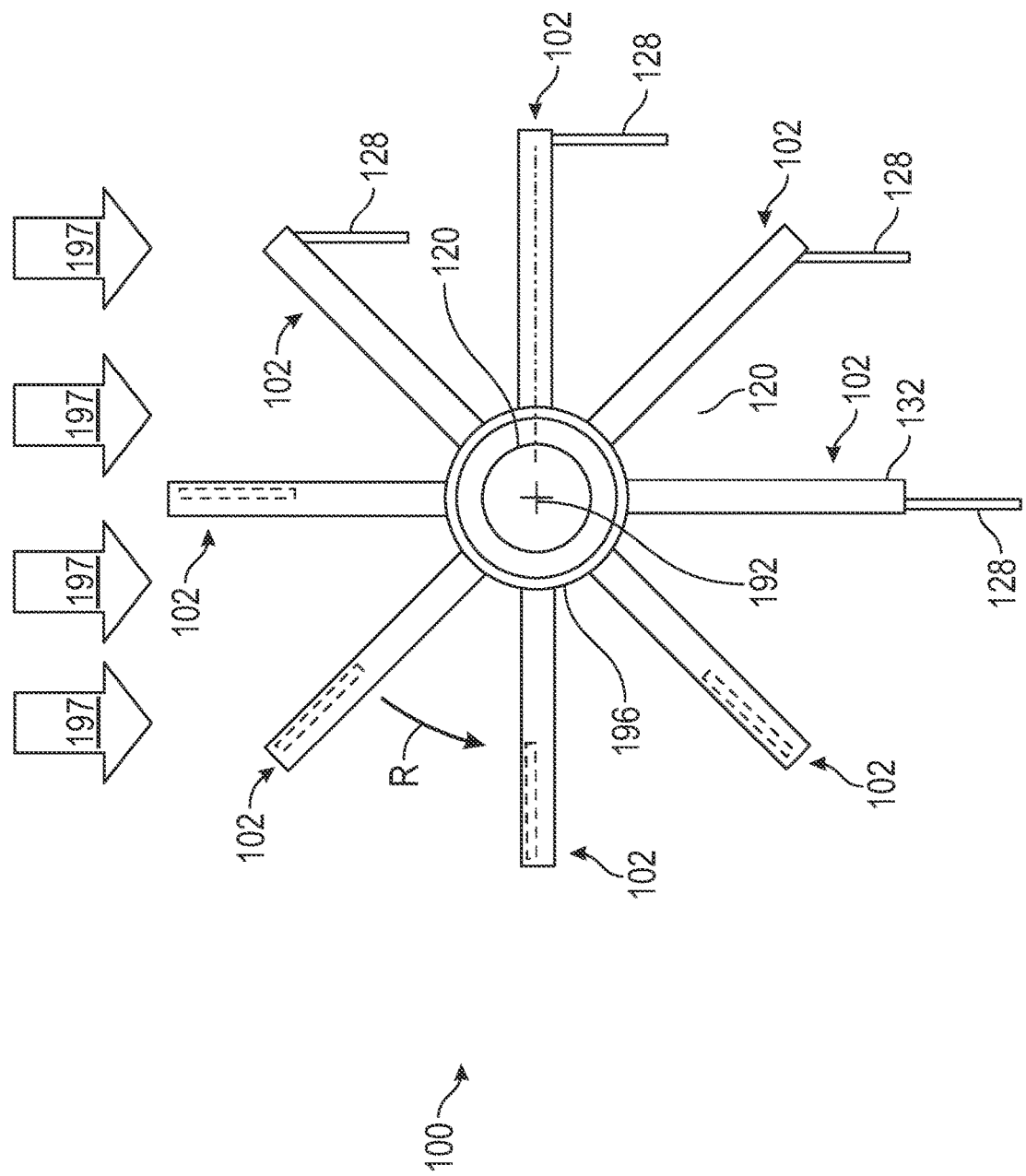
FIG. 1 is a side view of an embodiment of a system for harnessing hydro-kinetic energy having a series of vanes rotatable about a central axle.

FIG. 1 is a side view of an embodiment of a system 100 for harnessing hydro-kinetic energy. The system 100 and other embodiments herein may capitalize on the continuous circular form movement of energy of waves, or other laminar flow or turbulent flow of moving water. Thus the system 100 may harness circular oscillatory wave momentum. In some applications, hydro-kinetic energy may be dense on the upper surface of the kinetic flow, especially for an ocean wave. The system 100 may be configured to significantly lower overall system net volume and weight, enabling lower limits of hydro-kinetic flow rates to generate power and to minimize the need for and simplify supporting flotation systems, e.g. on the top end surface of the kinetic energy flow.

As shown in FIG. 1, the system has a series of vanes 102 rotatable about a central axle 196. The system 100 may include the elongated central axle 196 extending axially and defining a central axis 192. The central axis 192 may be positioned perpendicular or parallel to the direction of fluid flow 197, which is indicated schematically by the arrows as shown. The vanes 102 are shown rotating counterclockwise as oriented in the rotational direction R to generate electrical energy.

The plurality of vanes 102 may be positioned around the central axle 196. The plurality of vanes 102 may extend radially outwardly away from the central axle 196 from radially inward portions to radially outward portions. Any number of vanes 102 may be used. For example, two, three, four, five, six, seven, eight, nine, ten, eleven, twelve, thirteen, fourteen, fifteen, sixteen, seventeen, eighteen, nineteen, twenty, or more vanes 102 may be used. In some embodiments, more than one pair or set of vanes 102 extending radially outward from the central axle 196 may be used to create a system (e.g., system 103 shown in FIG. 3) comprising multiple vanes 102. Each set may include two vanes 102. Each vane 102 may include a frame 132 and a panel 128. The panel 128 may be rotatably attached to the frame 132 at a radially outward location of each vane 102. The vane 102 may include a rod 140 connecting the frame 132 to the central axle 196, as further described herein. The panel 128 may be rotatably attached to a radially outer end of the rod 140. The panel 128 may be rotatably attached to a radially outer end of the rod 140 and rotatably attached to the frame 132.

The panels 128 and/or frames 132 may form flow channels, which may be open cross-section flow channels such as C-shaped, as further described herein. The flow channels may facilitate rotation of the vanes 102 for optimal fluid flow characteristics along the panels 128 as the vane 102 rotates against the direction fluid flow 197 and for optimal structural integrity of the panel 128 as the vane 102 rotates with the direction of fluid flow for thrust generation, as further described. Cross-section flow channels, such as a C-shaped panel 128 may reduce turbulence against incoming turbulent fluid flow 197 while rotating against the flow (for example, the right side of FIG. 1). The C-shaped panel, in contrast to a conventional panel such as a panel shaped as flat rectangle or air foil format, enables an increase in turbine efficiency, reduces the structural robustness requirement of the hydro-turbine, and reduces overall system weight enabling the system to float by reducing the specific density of the system. The specific density of the system can be defined by system weight divided by the system volume of the equipment, which can be less than 100 kg/cubic meter system. Floating this devices can require about 0.1 cubic meter floating devices comparative to 1 cubic meter system size.

The system 100 may include a generator 120. The generator 120 may be used to convert rotational motion of the vanes 102 into electrical energy. The generator 120 may be located within the central axle 196 as shown, or outside the axle 196, or remote from the vane 102 and electrically connected thereto. A series of moveable magnets may be rotated by the vanes 102 and/or axle 196, which may interact with one or more stationary magnets, to generate electrical energy via induction.

The fluid flow 197, such as water flowing in a river, ocean, lake, etc., may apply a force to the panels 128 causing the plurality of vanes 102 to rotate about the central axis 192. The central axle 196 may thereby rotate about the axis 192. As the plurality of vanes 102 rotate about the central axis 192, the panels 128 may open and close relative to the corresponding frame 132 due to the force of the flowing fluid 197. As shown in FIG. 1, the plurality of vanes 102 are rotating about the central axle 196 in a counterclockwise direction. The panels 128 may start to rotate relative to the corresponding frames 132 depending upon the direction or angle that the force from the flowing fluid 197 is applied to the panels 128.

The panels 128 may rotate in a first direction relative to the respective frame 132 as the respective vane 102 flows with the fluid flow 197 direction, for example on the left side of the system 100 as oriented. The panel 128 may be prevented from rotating beyond a particular rotational position relative to the frame 132. Thus the panel 128 may be oriented with a planar face having a normal vector with a component that is parallel to the incoming fluid flow 197 direction, thus imparting a force on the panel 128 that may be maximum when the normal vector is parallel with the fluid flow 197 direction.

As the vane 102 rotates to the lower position as oriented in the figure, the panel 128 may rotate relative to the frame 132 as the vane 102 rotates against the fluid flow 197 direction, on the right side of the system 100 as oriented in the figure. The panel 128 may thus have the planar surface, with a normal vector that is perpendicular or approximately perpendicular to the direction of fluid flow 197. This surface may be the thin line like surface of the panel 128. The panel 128 may thus have a reduced surface area facing fluid flow 197 when rotating against fluid flow 197. Thus, the panel 128 may encounter a smaller force flowing against the fluid flow 197 compared to flowing with the fluid flow 197. Various features of the panel 128 and other components of the systems herein, such as flow channels etc., are described that optimize this maximum-minimum force relationship, such that the panel 128 experiences maximum and minimum forces during the respective portions of rotation of the vane 102 about the central axis 192, and so that the panel 128 is stabilized, as further described. Due to these and other features as described herein, enhanced performance and energy generation is achieved by the system 100.

Figure 2:
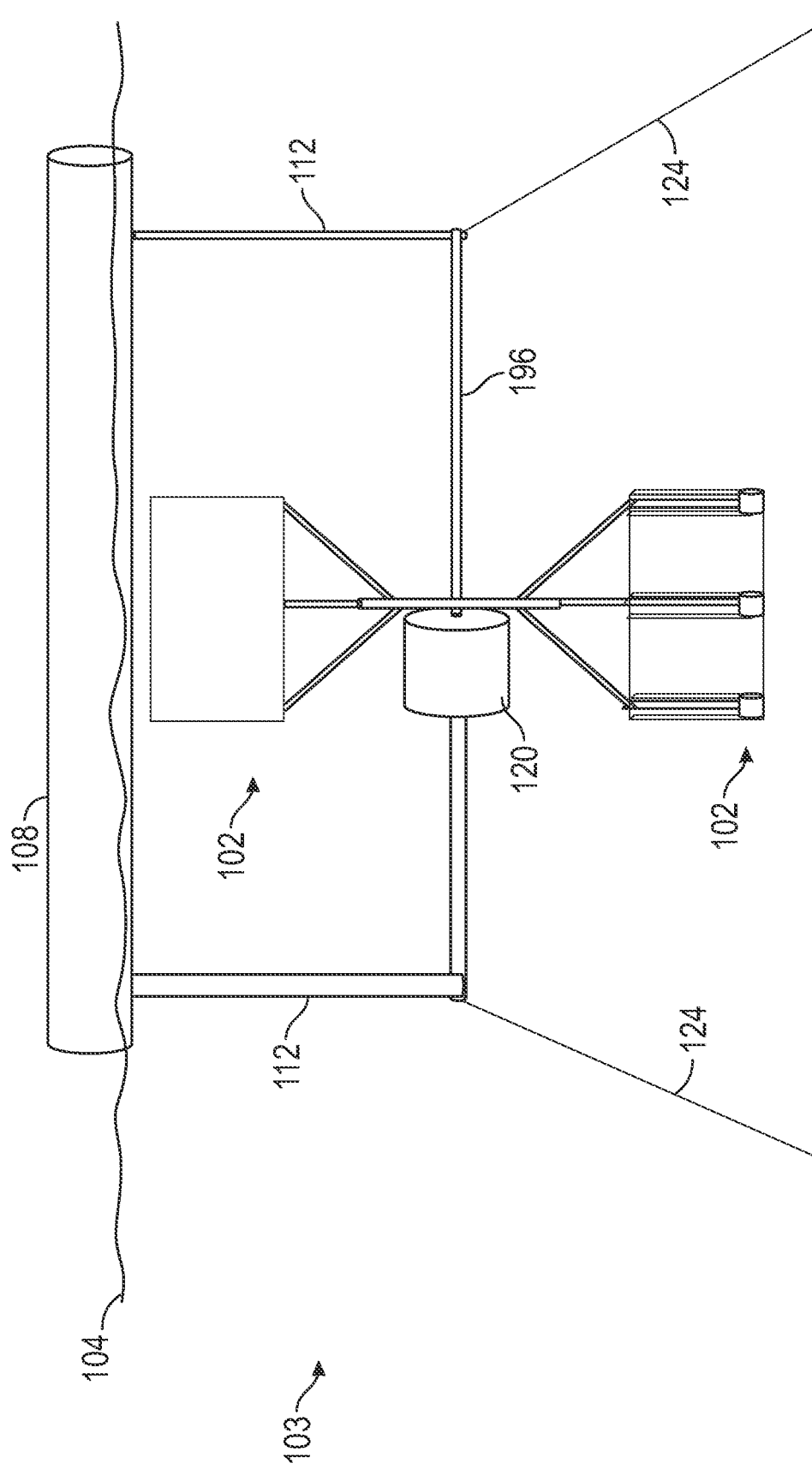
FIG. 2 is a side view of an embodiment of a system for harnessing hydro-kinetic energy having a series of vanes rotatable about a central axle and attached to a floating platform, such that the axis of rotation of the vanes is parallel to the water surface.

FIG. 2 is a side view of an embodiment of a system 103 for harnessing hydro-kinetic energy. The system 103 has a series of vanes 102 rotatable about a central axle 196 and attached to a floating platform or flotation member 108. The axis of rotation of the vanes 102 may be parallel to the water surface 104 as shown.

The system 103 may include any of the features of the system 100, and vice versa. The system 103 may include a mounting assembly to secure the system 103 in place. The mounting assembly may include the flotation member 108, one or more support members 112, the central axle 196, and/or one or more cables 124. The flotation member 108 may sit or float above the water surface line 104. In some embodiments, the flotation member 108 may be partially or fully submerged. The support members 112 may extend away from the flotation member 108, for example perpendicular from the flotation member 108. In some embodiments, the support members 112 may extend from the flotation member 108 at an angle. A first end of each support member 112 may be connected to the flotation member 108 and a second end of each support member 112 may connect to the central axle 196. The cables 124 may stabilize the system 103 and extend from the central axle 196 and/or support members 112 to a surface, for example, the ground. The cables 124 may extend down perpendicular to the central axle 196 or at angle from the central axle 196.

The system 103 may include one or more vanes 102 rotatably coupled to the central axle 196. The vanes 102 may rotate about the central axle 196 as a force is applied by the moving water. The system 103 may include the features of the system 100 shown in FIG. 1. The system 103 may thus include eight vanes 102, etc. The system 103 may include more than one set of rotating vanes 102. For example, there may be two, three, four, five, six, seven, eight, nine, ten, or more of the systems 100 located along the axle 196. There may one or multiple generators 120. There may be multiple systems 103 to form an expanded energy harvesting system, such as that shown in FIG. 3.

Figure 3:
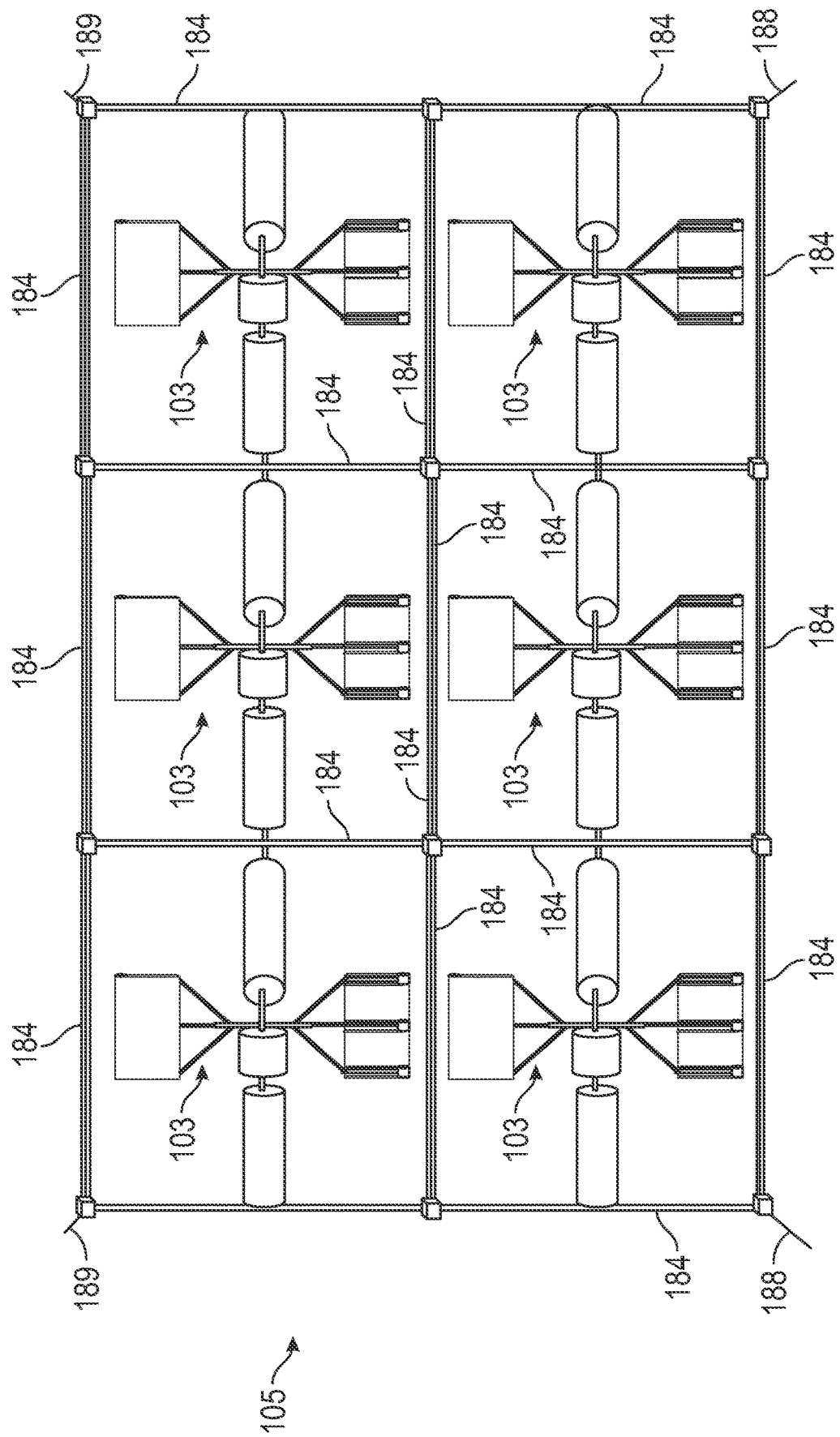
FIG. 3 is a top view of an embodiment of a system for harnessing hydro-kinetic energy having a series of rotatable systems each having vanes rotatable about a respective central axle and attached to a connected, floating platform.

FIG. 3 is a top view of an embodiment of a system 105 for harnessing hydro-kinetic energy. The system 105 has a series of the rotatable systems 103. Each system 103 has multiple vanes rotatable about a respective central axle and attached to a connected, floating platform. The system 105 includes six system 103, but there may be two, three, four, five, seven, eight nine, ten, or more of the systems 103.

The individual systems 103 may be coupled together via support members 184 to form a grid-like pattern. The expanded system 105 may have cables 188, 189 to secure the system 105 to a surface, such as the ground. The cables 188, 189 may be attached to buoys or other structures in the water. The expanded system 105 may have support members 189 that may be connected to a flotation member (e.g., the flotation member 108 of FIG. 2). Each individual system 103 may be positioned next to or above one or more individual systems 103. The system 105 may be parallel or perpendicular to the water surface, depending on the direction of water flow and the dynamics of the water. For example, the vanes 103 may partially rotate through the water and partially rotate through the air. Thus, various configurations are possible with the system 105.

FIG. 4A is a perspective view of an embodiment of a vane 102. The vane has a rotatable panel 128, having open cross-section flow channels, and may be used with the various energy harnessing systems of FIGS. 1-3.

The vane assembly or vane 102 may have the panel 128 rotatably attached to a frame 132 and/or to the rod 140. The frame 132 may include the rod 140 connected at a first, radially inward end to the central axle 196. A second, radially outward end of the rod 140 may be rotatably connected to the panel 128. The frame 132 may be coupled to a panel axle 136. The frame 132 may be coupled to the panel axle 136 via the rod 140. The panel axle 136 may be pivotably or rotatably connected to the panel 128 and to the rod 140. The frame 132 may include support members 168 extending from the rod 140. The support members 168 may attach to respective frame blades 140a.

The frame 132 includes two of the frame blades 140a. In some embodiments, the frame 132 may have three, four, five, six, seven, eight, nine, ten, or more of the frame blades 140a. The frame blades 140a may be elongated. The frame blades 140a may be planar or flat. The rod 140 may be elongated and planar with a radially outer end thereof forming a middle blade portion 140b between the frame blades 140a. In some embodiments, the frame blades 140a and blade portion 140b may all be the same length in the radial direction and height in the rotational direction. In some embodiments, the frame blades 140a and blade portion 140b may vary in length and/or height. For example, blade 140a may have a longer radial length than blade portion 140b formed by the rod 140, or vice versa. The various frame blades 140a and blade portion 140b extend outwardly away from the panel 128 surface when the panel 128 is rotated adjacent to the frame blades 140a as shown.

The rod 140 may have a uniform cross-section as shown. In some embodiments, the cross-section may be rounded at the radially inward end and have the planar blade shape at the radially outer end. The rod 140 may be positioned between the frame blades 140a. The rod 140 may be connected to the frame blades 140a via the support members 168. The support members 168 may be connected to the frame blades 140a at a first end and connected to the rod 140 at a second end. The support members 168 may be positioned at an angle. In some embodiments, the support members 168 may be positioned perpendicular to the rod 140.

The panel 128 includes panel blades 178. There are six panel blades 178. There may be one, two, three, four, five, seven eight, nine, ten, or more panel blades 178. The blades 178 may be elongated and planar, etc. similar to the frame blades 140a. The panel blades 178 extend outwardly away from a surface of the panel 128. The panel blades 178 may be attached to or integral with the panel 128. The panel blades 178 may extend from only one side of the panel 128 as shown, or the panel blades 178 may extend from both, opposite sides of the panel 128.

The panel blades 178 define flow channels 172. The flow channels 172 are elongated and extend along the length of and between opposing panel blades 178 from a radially outer end of the panel blades 178 to a radially inward end of the panel blades 178. Adjacent opposing pairs of panel blades 178 may each form one of the flow channels 172. There are three flow channels 172 as shown. There may be one, two, four, five, six, seven, eight, nine, ten or more flow channels 172. The flow channels 172 may have the same width and/or length, or they may have differing lengths and/or widths from each other. The flow channel 172 may have an open cross-section. By "open" cross-section it is meant the cross-section as taken transversely to a longitudinal length of the flow channel 172 is an open profile, such as a C-shape, or a U-shape, etc. This is in contrast to a closed cross section, which would have a closed profile, such as an air-foil shape, O-shape, or closed square or rectangle, etc. In some embodiments, the flow channels may have closed cross-sectional profiles. However, the open cross-section flow channels may provide an optimal combination of reducing system weight, a preferred (e.g. minimal) surface area for encountering incoming thrust forces minimizing conversion of incoming thrust forces into turbine thrust when rotating against the fluid flow direction, reducing cost of production, and enhancing structural integrity and durability of the system.

The panel blades 178 may further define second flow channels 173 located between separated panel blades 178. As shown, there are two second flow channels 173, each located between the inner pair of panel blades 178 and respective out pairs of panel blades 178. The second flow channels 173 may have a larger width than the flow channels 172, as shown. The second flow channels 173 may have the same or smaller width than the flow channels 172. The flow channel 173 may have an open cross-section. By "open" cross-section it is meant the cross-section as taken transversely to a longitudinal length of the flow channel 173 is an open profile, such as a C-shape, or a U-shape, etc. This is in contrast to a closed cross section, which would have a closed profile, such as an air-foil shape, closed square or rectangle, etc. In some embodiments, the flow channels may have closed cross-sectional profiles. However, the open cross-section flow channels of 173 may provide an optimal combination of reducing system volume/weight, a preferred surface area for encountering incoming thrust forces minimizing conversion of incoming thrust forces into turbine thrust when rotating against the fluid flow direction, reducing cost of production, and enhancing structural integrity and durability of the system.

The rod 140 may rotate about the central axle 196 when a force is applied to the rod 140. A force may be applied to the rod via the panel 128. A force may be applied to the panel 128 via the moving water. The panel 128 may rotate relative to the frame 132 and about the panel axle 136 when a force is applied to the panel 128. The panel 128 may relative to the frame 132 as the frame 132 rotates about the axle 196.

When the panel 128 is rotated away from the frame 132, the flow channels 172, 173 may receive fluid flowing therethrough. For example, when the vanes 102 are rotating against the direction of fluid flow 197, as shown on right side of FIG. 1, the panels 128 may be oriented such that the flow channels are aligned with the direction of fluid flow 197. The flow channels 172, 173 may thus stabilize the panels 128, reduce the fluidic drag acting against the panels 128 as the vanes 102 rotate against the fluid flow 197 direction, as well as add stiffness to the panels 128 by increasing the moment of inertia of the panels 128. The added stiffness improves mechanical robustness of the system and increases produced thrust when the panels 128 rotate toward the frame 132 and are acted on by the flowing fluid as the vanes 102 rotate in the direction of the fluid, enabling the system to harness harsher incoming fluid thrust while withstanding structural integrity, as shown on the left side of FIG. 1 as oriented.

FIG. 4B is a perspective view of another embodiment of the frame 132 that may be used with the various vanes described herein, such as those of FIGS. 1-4A. The panel 128 may be attached to the frame 132. In some embodiments, the rod 140 and frame blades 140a may be connected by support members 138. Any number of support members 138 may be used. For example, one, two, three, or more support members 138. Each support member 138 may extend from the uppermost frame blade 140a to the lowermost frame blade 140a. If more than one support member 138 is used, the support members 138 may be evenly spaced across the width of the frame 132. If more than one support member 138 is used, the support members 138 may be unevenly spaced across the width of the frame 132. In some embodiments, one of the support members 138 may be used to pivotably connect the frame 132 to the panel 128. For example, the radially outer support member 138 (on the right as oriented) may be used as the axle 136.

The rod 140 and frame blades 140a may include openings 142, such as holes, configured to receive and/or secure to the panel axle 136 (see FIG. 4A). The openings 142 may be located at radially outer ends of the frame blades 140a and rod 140. Further, the radially outer ends of the rod 140 and/or frame blades 140a may be located a radial distance L1 from the radially outer support member 138. The distance L1 may be chosen to limit rotation of the panel 128 when attached thereto. As further described herein, the system may include brackets or other members that act as stops and interact with the support member 138 to prevent rotation beyond a particular angle.

Figure 5B:
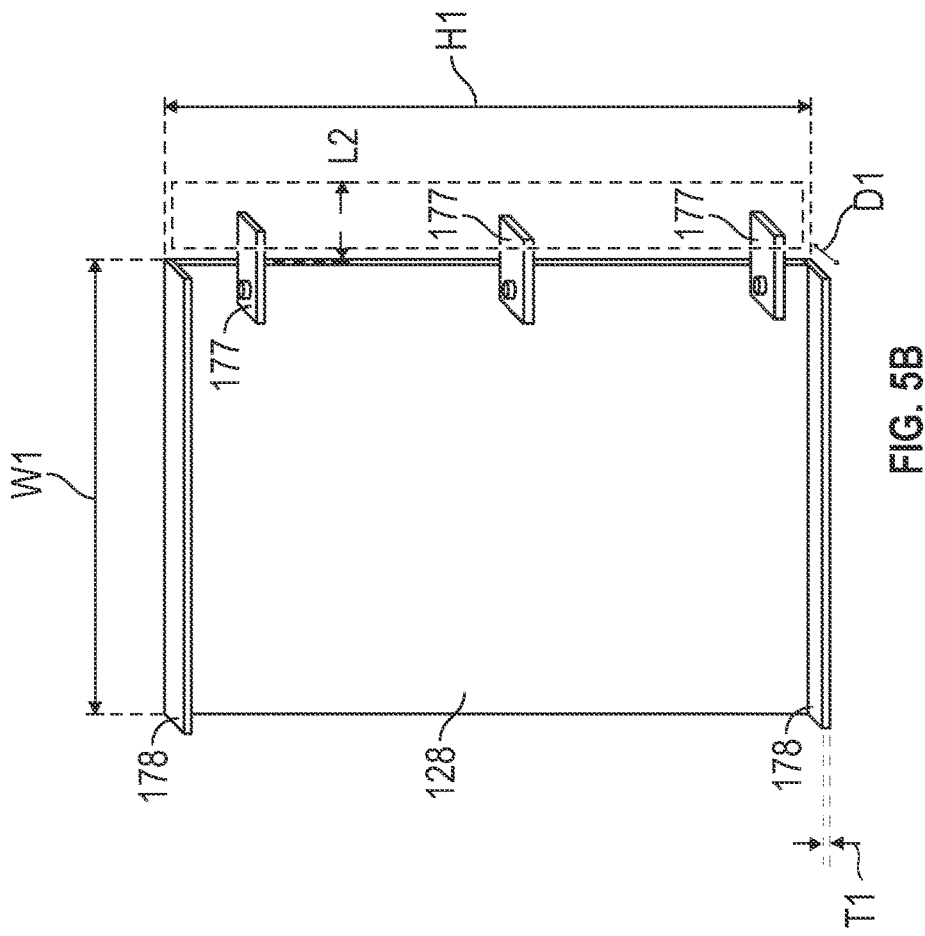
FIG. 5B is a perspective view of an embodiment of a panel having an open cross-section flow channel, that may be used with the various vanes described herein, such as those of FIGS. 1-3.
Figure 5A:
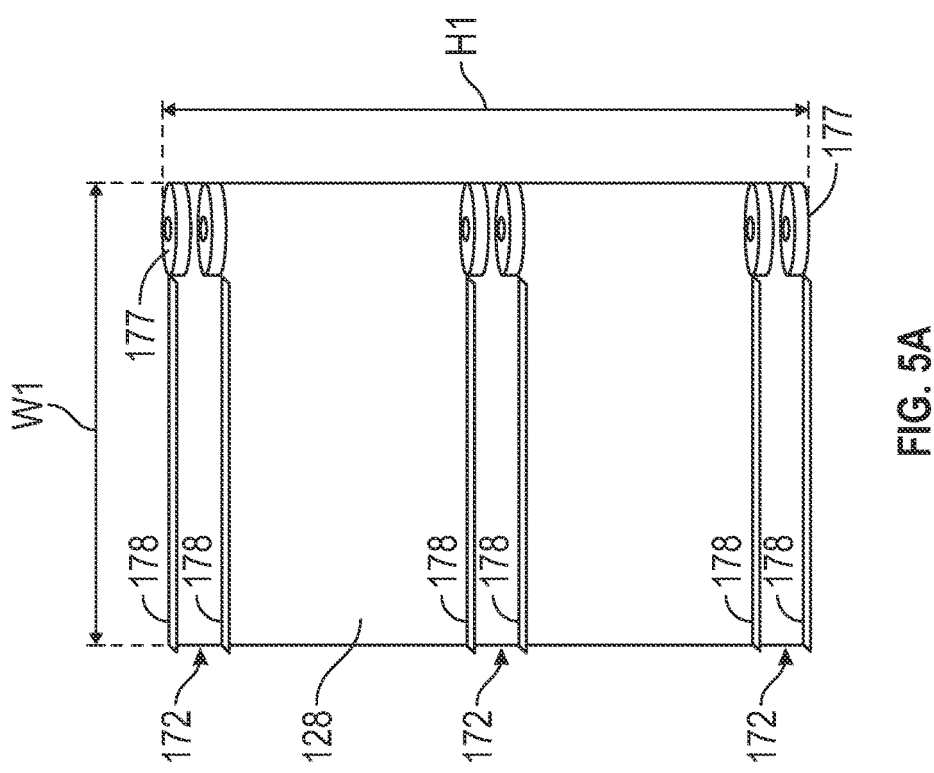
FIG. 5A is a perspective view of an embodiment of a panel having multiple open cross-section flow channels, that may be used with the various vanes described herein, such as those of FIGS. 1-4B.

FIGS. 5A and 5B are perspective views of different embodiments of the panel 128. The embodiment of the panel 128 in FIG. 5A has multiple open cross-section flow channels, and may be used with the various vanes described herein, such as those of FIGS. 1-4B. The embodiment of the panel 128 in FIG. 5B has a single, wide, open cross-section flow channel, and may be used with the various vanes described herein, such as those of FIGS. 1-3. The panels 128 of FIGS. 5A and 5B may have any of the features of the panels 128 described with respect to FIG. 4A, and vice versa, except as otherwise described.

The panels 128 may have an overall width W1, an overall height H1, overall depth D1, and an overall panel thickness T1. The width W1 may extend from a radially inward edge of the panel 128 to a radially outer edge of the panel 128. The height H1 may extend from a lower edge to an upper edge of the panel 128 as oriented. The depth D1 may be the depth or height of one or more of the blades in a direction perpendicular to the surface of the panel 128, which may be in a direction along a normal vector from a flat panel surface. The depth D1 may extend from an end of a flat surface of the panel 128. The thickness T1 may be determined by the structural integrity of the material. D1 and T1 may be determined in relation to H1, W1, and the harshness or level or strength of the incoming fluid thrust, to maintain structural integrity when harnessing and converting incoming harsh fluid flow into energy.

In some embodiments, the panel 128 may have structural robustness proportional to D1 and T1. When the turbine rotates against incoming fluid flow 197 in FIG. 1, the system can generate turbine thrust proportional to absolute surface area facing the incoming fluid flow 197. The surface area facing the incoming fluid flow 197 is determined by (H1+ (number of panel blades 178 extruding from panel 128)*D1) *T1, which can be far less than surface area determined by (H1*D1) or in a similar way for a conventional flat panel vane or air foil format panel. Therefore, the surface area results in significant reduction in turbine thrust formation which can enhance structural integrity with a significant reduction in system weight and material costs. In some embodiments the height H1 may exceed the width W1. In some embodiments the height H1 may be equal to the width W1. In some embodiments, the width W1 may exceed the height H1. The panel 128 may have a thickness in a direction perpendicular to the width and height. The width W1 may be from about six inches (in.) to about one hundred in. The height H1 may be from about twelve in. to about two hundred in. The thickness may be from about an eighth of an inch to about six inches. Dimensions of W1 and H1 will be determined by the desired energy to harness at the predetermined flow rate of incoming fluid energy. In some embodiments, the dimensions of W1 and H1 can be between one or more inches to multiple feet. T1 may be less than around 0.1 inches of metal or less than round 0.25 inches, e.g. of plastic material. D1 may be between around 1 inch to around 6 inches. In various embodiments, the values for H1, W1, T1, and D1 may vary further, for example based on the incoming fluid thrust characteristics.

The panels 128 may have the panel blades 178. The panel blades 178 may extend perpendicularly away from the panel 128 and have a length that stops short of brackets 177. The panel blades 178 have an overall radial length that is less than the width W1 of the panel 128, as shown. The panel blades 178 may have an overall radial length that is less than or greater than the width W1 of the panel 128. The lower-most panel blade 178 as oriented may be a distance H1 from the upper-most panel blade 178, as shown. In some embodiments, lower-most panel blade 178 as oriented may be less than a distance H1 from the upper-most panel blade 178, for example where the panel 128 surface extends beyond the upper and lower panel blades 178.

In some embodiments, a first panel blade 178 may extend perpendicular from a first upper end of the panel 128 as oriented. In some embodiments, a second panel blade 178 may extend perpendicular from a second lower end of the panel 128 as oriented. In some embodiments, a third panel blade 178 may extend from a position in between the first and second ends of the panel 128. The various flow channels 172 may thus be defined by the panel blades 178, as described. The larger inner flow channels 173 may also be located between pairs of panel blades 178, as described.

The panel 128 may include one or more brackets 177, which may act as stops, among other functions. The brackets 177 may be structural members located at a radially outer end of the panel 128. The brackets 177 may rotatably connect with the panel axle and may be configured to limit rotation of the panel 128 relative to a frame of a vane. The brackets 177 may rounded as in FIG. 5A or square or rectangular as in FIG. 5B. The brackets 177 contact a portion of the frame to stop further rotation of the pane 128. The brackets 177 may contact the support member 138 of FIG. 4B, for example. The brackets 177 may include openings therethrough as shown that receive the panel axel 136. The brackets 177 rotate about the panel axle 136. Radially outer portions of the brackets 177 may contact the support member 138 to limit panel rotation. In some embodiments, the brackets 177 may not contact the frame or limit rotation.

As shown in FIG. 5B, the brackets 177 may be positioned a distance L2 from the radially outer edge of the panel 128. The distance L2 may define the location of interference with the frame to limit rotation. Thus, the bracket 177 may be assembled to not extend beyond L2 as shown, such that rotation is not limited. Or the brackets 177 may be assembled to extend beyond L2, such that rotation is limited. The distance L2 may be less than, greater than, or the same as L1 in FIG. 4B.

The length L2 may represent the distance between a side of the panel 128 and the end of the panel brackets 177. The length L2 may represent the distance between the support member 138 (see FIG. 4B) and the end of the frame blade 140. In some embodiments, L2 is 90% or about 90% of the length L1. In some embodiments, L2 may be 95% or less, 90% or less, 85% or less, 80% or less, or 75% or less of the length L1.

The ratio between L1 and L2 may assist in limiting rotation of the vanes 102. The interaction between the extension of the rod 140 and the bracket 177 can prevent the panel 128 from opening past one hundred eighty degrees. For example, the extension of the frame blade 140 will contact the panel bracket 177 preventing further rotation.

There may be various fluid flow channels 172 or 173 with open-cross sections, as described. The fluid-flow channels 172 may be C-shaped, U-shaped, V-shaped, or other shapes that do not have closed profiles. The open cross-section for the fluid flow channels 172 can reduce the resistance of the vane 102 against an opposing thrust or force of the water by minimizing the area against which the thrust acts.

In some embodiments, the panel 128 of FIG. 5B may only have panel blades 178 positioned at the first and second ends of the panel 128. Thus one large flow channel may be formed by the panel 128, as described. In some embodiments, sets or pairs of panel blades 178 may be used to create the fluid flow channels 172. In some embodiments, a combination of panel blades 178 and frame blades 140, 140a may be used to create the fluid flow channels 172. The fluid flow channels 172 are discussed in more detail herein.

Figure 6A:
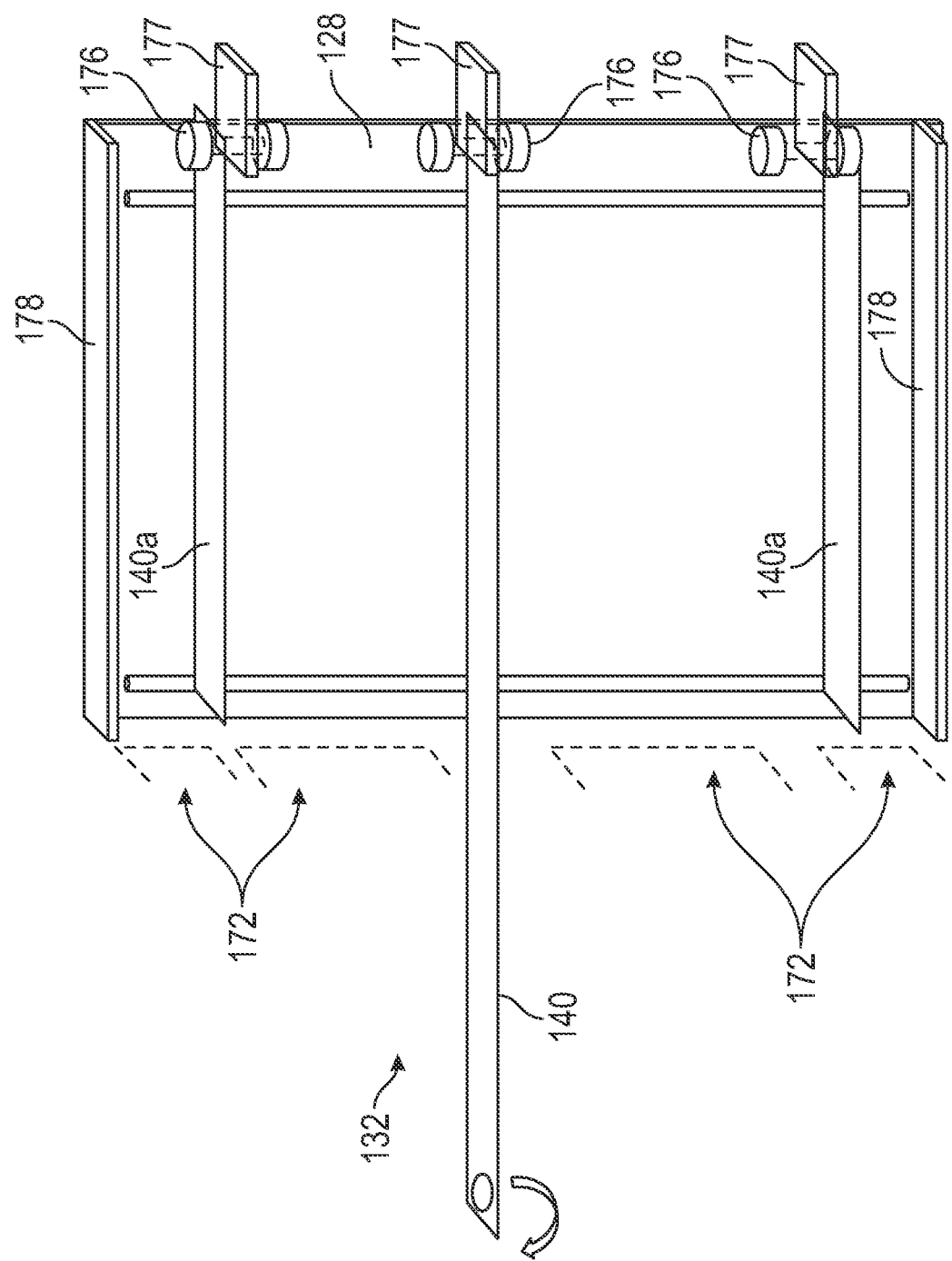
FIG. 6A is a perspective view of an embodiment of a vane having flow channels formed by blades on a panel and blades on a frame, and that may be used with the various energy harnessing systems described herein, such as those of FIGS. 1-5B.

FIGS. 6A-6C are example embodiments of the frame 132 pivotably connected to the panel 128. FIG. 6A is a perspective view of an embodiment of a vane having flow channels 172 formed by blades 178 on a panel 128 and a blade portion of a frame 132, and that may be used with the various energy harnessing systems described herein, such as those of FIGS. 1-5B.

As shown in FIG. 6A, the rod 140 and/or one or more frame blades 140a may be connected to a corresponding bracket 177 of the panel 128. A coupling member 176 such as a pin may be used to connect the rod 140 and frame blades 140a and the panel protrusions or brackets 177. The brackets 177 may be used to prevent rotation of the panel 128 beyond a maximum rotation angle when in an open position, as described in more detail below.

When in a closed position, the frame 132 and the panel 128 may create one or more fluid flow channels 172. The fluid flow channels 172 may be partially formed by the rod 140 and frame blades 140a. The fluid flow channels 172 may be partially formed by the panel blades 178. The fluid flow channels 172 may be formed by a combination of the rod 140, frame blades 140a, and/or the panel blades 178. The number of fluid flow channels 172 formed may correspond to the total number of blades or blade portions.

In some embodiments, the fluid flow channels 172 may have varying widths, as measured perpendicularly between opposing blades forming the channel. In some embodiments, the fluid flow channels 172 may all have the same width. In some embodiments, the fluid flow channels 172 may have varying widths. As shown, the outer flow channels 172 have a smaller width then the inner flow channels 172.

FIG. 6B is a perspective view of an embodiment of a panel 128 and a partial frame that may be used with the various vanes described herein, such as those of FIGS. 1-6A. The frame blades 140, 140*a* may be positioned between the panel blades 178 when the panel 128 is rotated adjacent to the frame 132. A set of two panel blades 178 may have a corresponding frame blade 140, 140*a* that is positioned between the two opposing panel blades 178. There may be two panel blades 178 for every frame blade 140, 140*a*. When the panel 128 transitions from an opened state to a closed state, the frame blades 140, 140*a* may return to the position between the corresponding panel blades 178.

FIG. 6C is a perspective view of an embodiment of the panel 128 having a corrugated topography that may be used with the various energy harnessing systems and devices described herein, such as those of FIGS. 1-6B. The vane 102 (partially shown) has a panel 128 with a corrugated contour. The panel 128 may have alternating ridges 179 and grooves 181. The ridges 179 and/or grooves 181 may form peaks and valleys of differing heights. The ridges 179 and/or grooves 181 may be pointed as shown, or they may be curved. The corrugated panel 128 may have panel blades 178 that extend perpendicular to the panel 128 as described herein. The vane 102 and panel 128 of FIG. 6C may have any of the features of any other vanes 102 or panels 128 described herein, and vice versa. The panel 128 with corrugated surface may be used with any of the energy harvesting systems described herein. The corrugation may be on one or both sides of the panel 128. The corrugated features may create additional flow channels along the panel through which fluid may flow. The corrugations may also add stiffness to the panel.

Figure 7A:
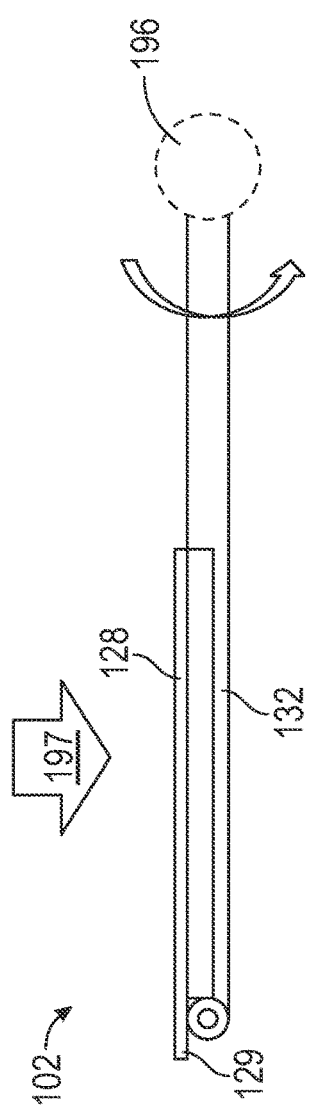
FIGS. 7A-7C are sequential side views of an embodiment of a vane showing a rod rotating about a central axle and a panel rotating relative to the rod, and that may be used with the various energy harnessing systems and devices described herein, such as those of FIGS. 1-6C.
Figure 7B:
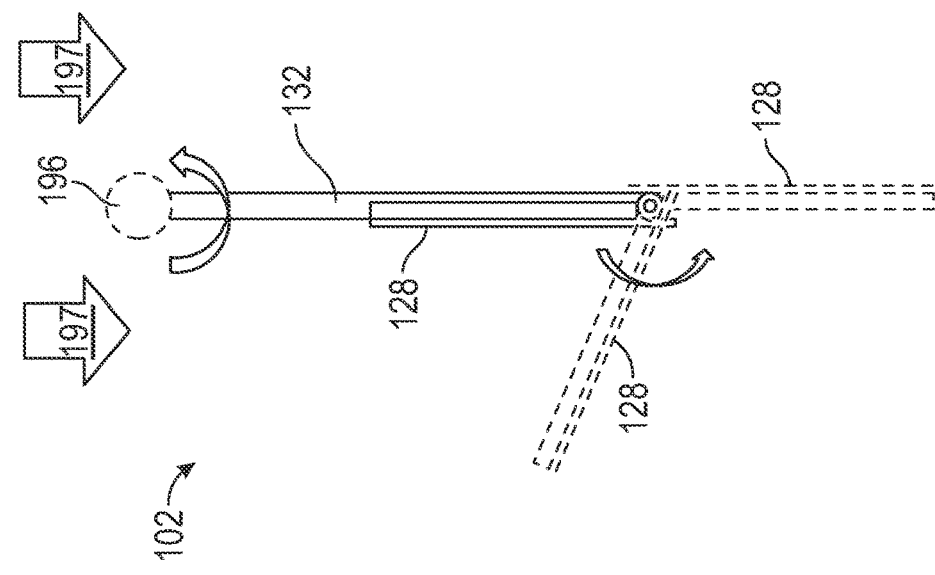
Figure 7C:
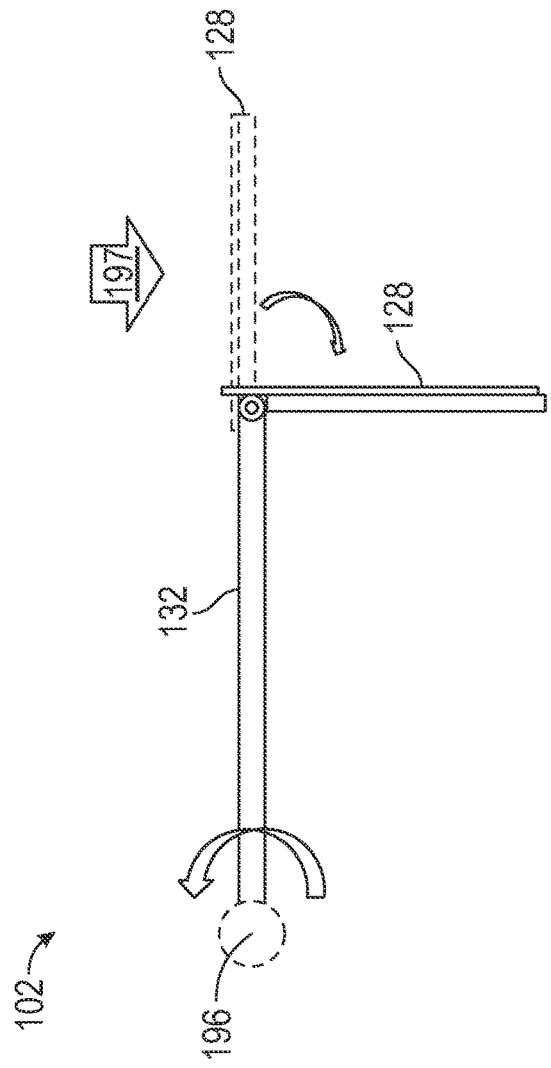

FIGS. 7A-7C are sequential side views of an embodiment of a vane 102 showing a rod 132 rotating about a central axle 196 and a panel 128 rotating relative to the rod 132, and that may be used with the various energy harnessing systems and devices described herein, such as those of FIGS. 1-6C. The panel 128 is shown transitioning from a closed position where maximum torque is generated (FIG. 7A), to an open position where minimum torque is generated (FIG. 7C).

FIG. 7A shows the panel 128 in a closed position. As shown, the vane 102 is connected to the central axle 196 via the frame 132. In the closed position, the panel 128 may contact the frame 132. The frame blades (e.g., frame blades 140, 140*a*) may be located within corresponding flow channels (e.g., channels 172). A force 197 applied by the moving fluid 197, such as water, to the panel 128 may be at its maximum when the panel 128 is in a closed position. While the panel 128 is in a closed position the vane 102 may continue to rotate about the central axis of the central axle 196. In this position, the vane 102 may rotate with the flow direction of the moving fluid 197.

The panel 128 may include a lip 129 extending outwardly away from the panel. The lip 129 may prevent rotation of the panel 128 beyond a particular angle. The panel 128 may thus extend farther than the blades or other features to form the lip 129. The lip 129 may contact the frame or other features when rotated to the fully open position, such as that shown in FIG. 7B by the lower dashed position as oriented.

FIG. 7B shows the panel 128 transitioning from the closed to various open positions, as the vane 102 rotates from positions where it is moving with the fluid 197 direction to positions where the vane 102 is moving against the fluid 197 direction. As shown, the panel 128 rotates about the central axle 196. The force 197 applied by the moving fluid or water may now contact the panel 128 from a different angle causing the panel 128 to rotate away from the frame 132. The panel 128 may rotate about the frame 132 to a maximum angle of 180 degrees.

FIG. 7C shows the panel 128 rotated to an open position where the panel 128 is perpendicular to the frame 132 and parallel to the direction of fluid 197 flow. While the panel 128 is rotating about the frame 132, the vane 102 may continue to rotate about the central axle 196. In this position, the vane 102 may rotate generally against the flow direction of the moving fluid 197. When in the open positions, the fluid 197 may flow through the channels (e.g. channels 172) and the force 197 being applied to the panel 128 by the water may be at its minimum.

The flow channels stabilize the panels 128 and control the flow of the fluid 197 across the panel 128. The various blades reduce or prevent bending of the panels 128, which reduces irregular or turbulent flow over the panel 128. The linear flow channels also direct the fluid across the panel to cause a more orderly flow. These effects results in lower forces on the panel from the fluid 197 as the panel 128 rotates against the fluid 197 flow direction. For example, the drag is reduced due to more laminar flow across the panel 128. Further, stability of the panel reduces thrust forces from acting perpendicularly on the panel 128. Thus, the flow channels result in improved fluid dynamics and structural behavior of the system. In aggregate, the improvements add up over the lifetime of use of the energy harvesting system, to improve durability, enhance efficiency, and increase power generation.

Further, the enhanced performance of the system may allow for having only a single central axle, where all vanes rotate about the single central axle, as described herein. This is in contrast to other systems that use multiple axles, for example with conveyor belt-style arrangements. Such systems typically extend deep into the water, but the velocity of water diminishes at deeper depths, which imbalances available energy. The flow channels and other features of the system described herein allow for fewer parts and less complexity than these other systems, among other advantages. For example, the systems described herein may be light enough to allow submersible on the surface of the wave to capture the highest wave energy. The systems described herein may be designed to be minimum resistance thrust formed from incoming wave energy to allow a full conversion of incoming wave thrust into wave turbine energy and minimize turbine structural deterioration and damage to withstand turbine thrust formed by incoming wave thrust.

FIG. 7C shows the panel 128 transitioning to a closed position. As the vane 102 continues to rotate about the central axle 196, the force 197 of the water or fluid is applied perpendicular to the panel 128. The force 197 may cause the panel 128 to rotate about the frame 132 and back to a closed position. While the panel 128 transitions to a closed position, the vane may continue to rotate about the central axle 196. In this position, the vane 102 may rotate against the flow direction of the moving fluid.

Figure 8:
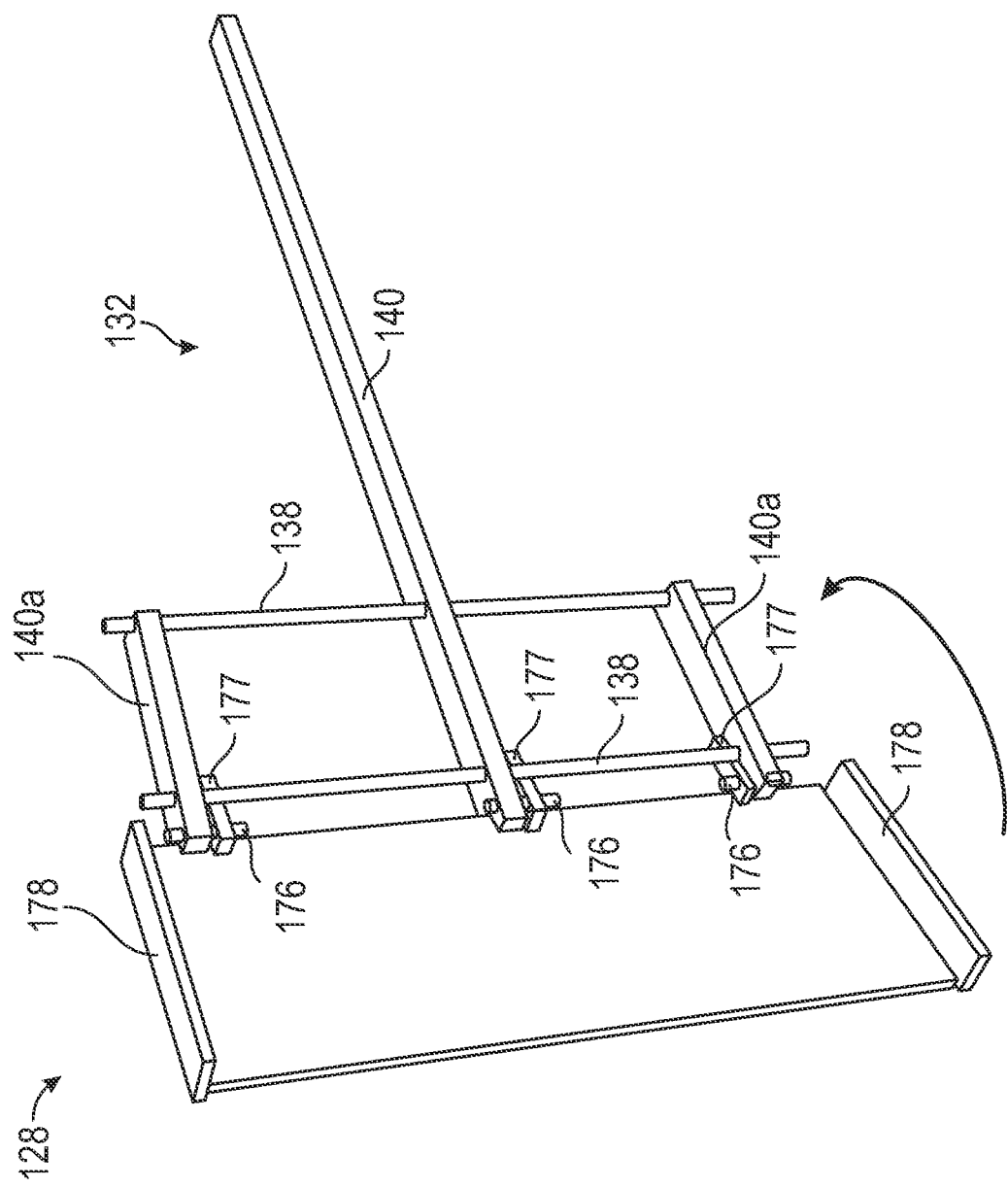
FIG. 8 is a perspective view of an embodiment of a vane having a rod, frame and panel with a flow channel, and that may be used with the various energy harnessing systems and devices described herein, such as those of FIGS. 1-7C.

FIG. 8 is a perspective view of an embodiment of a vane having a frame 132 and panel 128 with a flow channel, and that may be used with the various energy harnessing systems and devices described herein, such as those of FIGS. 1-7C. The vane of FIG. 8 may be used with any of the energy harvesting systems described herein. Further, the vane of FIG. 8 may have any of the features of any other vane described herein, and vice versa.

As shown in FIG. 8, a central rod 140 of the frame 132 extends radially outward and rotatably attaches to the panel 128. Transverse support members 138 connect with the rod 140 and outer blades 140a. The brackets 177 attach to the panel 128 and extend radially inwardly therefrom as oriented. The panel 128 is rotatably attached to the frame blades 140a via coupling members 176, such as pins or rods, extending through radially outer ends of the frame blades 140a and portions of the brackets 177 located near the panel 128. The radially outer support member 138 may therefore act as an axle. The panel 128 is shown rotated to an open position, and further rotation is limited by the brackets 177 contacting the radially outer support member 138. As the panel 128 rotates to a closed position (in the direction indicated by the arrow), the brackets 177 will rotate with the panel 128. In the closed position, the flow channels will be formed by the panel blades 178 and the frame blades 140a and radially our blade portion of the rod 140, as described.

Various modifications to the implementations described in this disclosure will be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations, unless otherwise stated.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Additionally, other implementations are within the scope of the following claims. In some cases, the actions recited in the claims may be performed in a different order and still achieve desirable results.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system for harnessing energy from moving water, the system comprising:
    a single central axle defining a central axis;
    a plurality of vanes configured to rotate about the central axis, each vane comprising a rod extending from the central axle, a frame attached to the rod, and a panel rotatably attached to an outer end of the vane, the panel comprising a series of perpendicularly extending blades forming a plurality of channels each having a C-shaped cross-section and at least two of the channels having differing widths, wherein movement of surrounding water in a first direction causes the panel to rotate relative to the rod between an open position and a closed position as the rod rotates about the central axis, wherein in the closed position the panel contacts the frame with members of the frame located within a respective channel of the plurality of channels such that a thrust force applied by the moving water to the panel is maximum, and wherein in the open position the panel is approximately at a right angle to the rod while rotating against the first direction of the moving water such that the moving water flows through the channels and the thrust force applied by the moving water to the panel is minimum; and
    a generator configured to convert the rotational motion of the plurality of vanes into electrical energy.

2. The system of claim 1, wherein the rod has an elongated cross-section such that the rod, when adjacent to the panel in the closed position, forms an additional channel having the C-shaped cross-section.

3. The system of claim 1, wherein the panels comprise a corrugated contour.

4. The system of claim 1, wherein the series of perpendicularly extending blades of the panel comprises a first perpendicularly extending blade having a longer length than the remaining perpendicularly extending blades.

5. The system of claim 4, wherein the first perpendicularly extending blade having the longer length is positioned between the remaining perpendicularly extending blades.

6. The system of claim 1, wherein the outer end of the rod comprises a panel axle that rotatably connects the rod and the panel.

7. The system of claim 1, further comprising a stop configured to prevent rotation of the panel in the open position beyond a maximum rotation angle.

8. The system of claim 1, comprising three or more of the vanes.

9. The system of claim 1, wherein the system is configured to generate electrical energy with the central axis oriented perpendicular or parallel to a surface of the moving water.

10. A method of harnessing energy from moving fluid, the method comprising:

rotating a rod about a central axis with a flow direction of the moving fluid, the rod having a panel rotatably attached with a radially outer end of the rod, and the panel having a side with one or more blades extending outwardly therefrom to form a plurality of flow channels;

rotating the panel toward the rod such that the side of the panel with the one or more blades faces toward the rod, as the rod rotates about the central axis with the flow direction of the moving fluid;

rotating the rod about the central axis against the flow direction of the moving fluid;

rotating the panel away from the rod, as the rod rotates about the central axis against the direction of the moving fluid, such that the moving fluid flows through the plurality of flow channels; and converting rotational motion of the rod into electrical energy.

11. The method of claim 10, wherein the plurality of flow channels comprise open cross-section flow channels.

12. The method of claim 10, further comprising rotating the panel relative to the rod via a frame that rotatably connects the panel and rod.

13. The method of claim 10, wherein the moving fluid comprises a moving water in a body of water, and further comprising orienting the central axis perpendicular or parallel to a surface of the moving water.

* * * * *